US012789489B2

(12) United States Patent
Biskop et al.

(10) Patent No.: US 12,789,489 B2
(45) Date of Patent: Nov. 10, 2026

(54) METHOD OF MANUFACTURING A MOULD FOR AN OPTICAL ELEMENT

(71) Applicant: ADDOPTICS B.V., Rotterdam (NL)

(72) Inventors: Gregorius Petrus Franciscus Biskop, Rotterdam (NL); Catherine Cornelia Johanna Hage, Rotterdam (NL)

(73) Assignee: ADDOPTICS B.V., Rotterdam (NL)

( * ) Notice: Subject to any disclaimer, the term of this patent is extended or adjusted under 35 U.S.C. 154(b) by 60 days.

(21) Appl. No.: 18/855,374

(22) PCT Filed: Apr. 21, 2022

(86) PCT No.: PCT/NL2022/050215

§ 371 (c)(1),
(2) Date: Oct. 9, 2024

(87) PCT Pub. No.: WO2023/204697

PCT Pub. Date: Oct. 26, 2023

(65) Prior Publication Data

US 2025/0236080 A1 Jul. 24, 2025

(51) Int. Cl.
*B29D 11/00* (2006.01)
*B29C 64/112* (2017.01)
(Continued)

(52) U.S. Cl.
CPC ........ *B29D 11/0048* (2013.01); *B29C 64/112* (2017.08); *B33Y 10/00* (2014.12); *B33Y 50/00* (2014.12); *B33Y 80/00* (2014.12)

(58) Field of Classification Search
CPC .......... B29D 11/0048; B29D 11/00009; B29D 11/00432; B29D 11/005; B29C 64/112;
(Continued)

(56) References Cited

U.S. PATENT DOCUMENTS

2009/0206498 A1* 8/2009 Tepedino, Jr. ... B29D 11/00009 264/1.36
2012/0248637 A1* 10/2012 Chang .................... B29C 33/42 249/121
(Continued)

FOREIGN PATENT DOCUMENTS

CN 1978352 B 6/2007
WO 2019/135098 A1 7/2019
WO 2020/190142 A1 9/2020

OTHER PUBLICATIONS

International Search Report and Written Opinion dated Jan. 16, 2023, for International Application PCT/NL2022/050215.

*Primary Examiner* — Nahida Sultana
(74) *Attorney, Agent, or Firm* — Dobrusin Law Firm, P.C.

(57) ABSTRACT

One or more master pieces, representing, in conjunction, an optical element like a lens, are printed on a substrate, for example by deposition of droplets of a master substance. In case of one or more master pieces, the pieces are well aligned relative to one another. The master substance is allowed to settle and subsequently, a mould substance is provided in one or more formworks provided around the master pieces. The mould substance is allowed to settle, thus providing one or more mould pieces with a partial cavity being the negative of the one or more master pieces. By proper alignment of the mould pieces, the partial cavities form a single compound cavity in which a lens compound may be provided for manufacturing of the optical element.

13 Claims, 4 Drawing Sheets

(51) Int. Cl.
*B33Y 10/00* (2015.01)
*B33Y 50/00* (2015.01)
*B33Y 80/00* (2015.01)

(58) Field of Classification Search
CPC ..... B29C 33/3857; B33Y 10/00; B33Y 50/00; B33Y 80/00; B22F 5/007; B22F 10/80
USPC ................................ 264/219, 225, 226, 227
See application file for complete search history.

(56) References Cited

U.S. PATENT DOCUMENTS

| | | | | |
|---|---|---|---|---|
| 2017/0031059 | A1* | 2/2017 | Valeri | B29C 37/0025 |
| 2017/0165931 | A1* | 6/2017 | Wolterink | B33Y 80/00 |
| 2017/0210072 | A1* | 7/2017 | Rodriguez | G02B 1/10 |
| 2020/0338818 | A1* | 10/2020 | Teng | B22F 10/18 |
| 2021/0339490 | A1* | 11/2021 | Körner | B29D 11/00009 |
| 2022/0168960 | A1* | 6/2022 | Muller | B29C 64/135 |
| 2023/0364871 | A1* | 11/2023 | Shan | B29D 11/00634 |
| 2023/0391029 | A1* | 12/2023 | Neal | B29C 33/3835 |

* cited by examiner

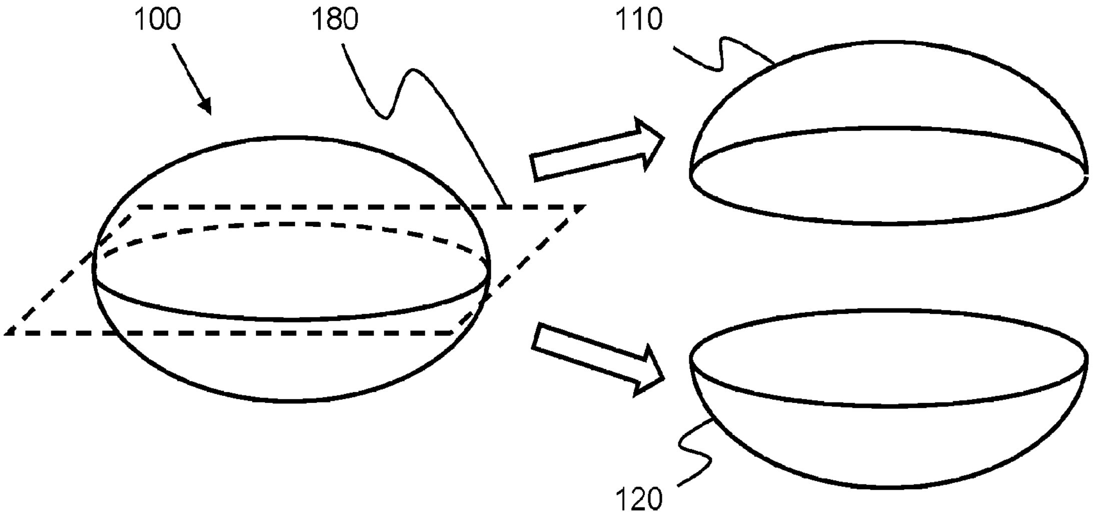
Fig. 1 A
Fig. 1 B
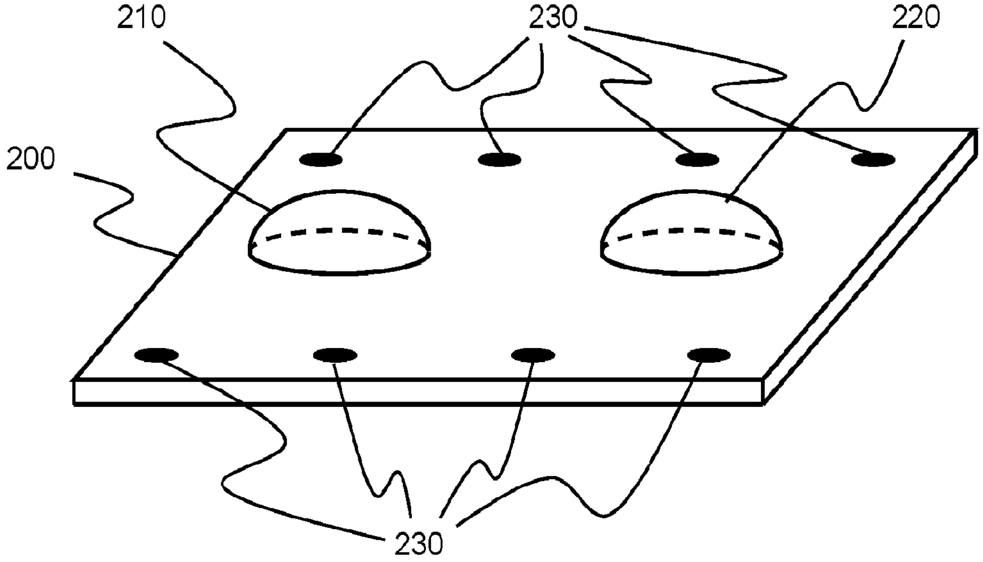
Fig. 2

METHOD OF MANUFACTURING A MOULD FOR AN OPTICAL ELEMENT

TECHNICAL FIELD

The various aspects and examples thereof relate to manufacturing of a mould for optical elements.

BACKGROUND

Moulds for injection moulding, rotation moulding or any other moulding process used for shaping a substantially fluid material are manufactured using milling processes. Based on a three-dimensional computer model, designed using Computer Aided Design-CAD-software, cavities are milled in one, usually two and sometimes more blocks of metal. The blocks of metal are joined such that the partial cavities form one cavity, in which the mouldable compound may be provided for shaping the final product.

SUMMARY

A milling process uses rotating cutters, provided in a material or compound having a harness larger than the material for the mould. By rotating the cutter and controlling the position thereof relative to the material, the cavity is shaped. The cutter has sharp edges and as a result thereof, the cutting process leaves scratches inside the cavity. With optical elements, such scratches may result in scattering of light during use of the optical element. In precision optical processes, but also in more general applications, scattering may be undesirable and is preferably reduced or even prevented. Therefore, a mould without any scratches or with a very small amount of acute irregularities—or no such irregularities at all—is preferred.

As first aspect provides a method of manufacturing a mould for an optical element. The method comprises receiving, in a three-dimensional printing system, a first dataset providing a three-dimensional representation of a first part of the optical element, receiving, in the three-dimensional printing system, a second dataset providing a three-dimensional representation of a second part of the optical element, depositing on a first substrate area, by the three-dimensional printing system, a first amount of master substance in accordance with the first dataset to provide a first master piece and depositing on a second substrate area, by the three-dimensional printing system, a second amount of master substance in accordance with the second dataset to provide a second master piece. The method further comprises providing, on the first substrate area, a first formwork around the first master piece, providing, on the second substrate area, a second formwork around the second master piece, providing a first amount of mould substance in the first formwork, providing a second amount of mould substance in the second formwork. The first amount of mould substance is allowed to settle, thus forming a first mould and the second amount of mould substance is allowed to settle, thus forming a second mould. Subsequently, the formwork is removed.

By printing the master pieces, for example by deposition of droplets, master pieces may be manufactured that have a smooth surface, as no mechanical processing or post-processing is to be applied. Thus, a substantially scratch-free, and, if executed in an appropriate cleanroom environment, defect-free or low-defect surface of the master pieces may be provided. Such surface provides a basis for manufacturing of mould pieces having an amount of defects in the same order, having a size in the same order as those of the master pieces.

The mould substance as well as the master substance may comprise one or more materials. The mould substance may settle by virtue of two materials in the mould substance to react, by reaction of the mould substance with matter in the environment of the mould substance, like, oxygen, nitrogen, another gas, water vapour or atomised water or other liquid, another matter or a combination thereof. Alternatively or additionally, the mould substance may be allowed to settle by virtue of evaporation of a solvent, under influence of temperature, UV curing or any other process of adding energy to or withdrawing energy from the mould substance.

The first aspect may comprise receiving, in a computer system, a master data set providing a three-dimensional model of the optical element and determining section plane intersecting at least part of the model, defining the first dataset on a first side of the section plane and the second dataset on a second side of the section plane. By dividing the three-dimensional model by means of a section plane, the two or more resulting datasets represent parts of the model that have at least one flat surface. This flat surface may provide a bottom part of a master piece to be printed on a substrate; the printing of matter on a flat surface results in the flat surface defined by the section plane. This may aid at convenience of discharging of a mould thus manufactured.

In the method, the first substrate area may comprise a first marker point and the second substrate area may comprise a second marker point; the first amount of master substance may deposited aligned with the first marker point and the second amount of master substance may be deposited aligned with the second marker point. This allows the master pieces and deposition thereof to be aligned with the marker points, which means that the position of the master piece or master pieces on the substrate may be well defined.

The first substrate area may comprise a first alignment element engagement point arranged to engage with a first alignment element and the second substrate area may comprise a second alignment element engagement point arranged to engage with a second alignment element. The method may further comprise, prior to providing the first amount of mould substance and the second amount of mould substance providing the first alignment element in engagement with the first alignment element engagement point; and providing the second alignment element in engagement with the second alignment element engagement point. The alignment elements may in this way be incorporated in the mould parts, which may facilitate alignment of the mould parts.

At least one of the first alignment element and a negative thereof in the first mould may be arranged to mate with at least one of the second alignment element and a negative thereof in the second mould. This may make joining the mould parts to a single mould more convenient.

The method may further comprise, prior to providing the first amount of mould substance and the second amount of mould substance providing a first reinforcement structure on or in the vicinity of the first substrate area; and providing a second reinforcement structure on or in the vicinity of the second substrate area; such that at least part of the first reinforcement structure and the second reinforcement structure are embedded in mould substance. This may allows for flexible compounds to be used for manufacturing of the mould parts, which may still be flexible after settling and curing in particular. Flexible mould material may be convenient to make discharge of the optical elements form mould parts more convenient.

The method may further comprise, prior to or in combination with depositing the first amount of master substance and the second amount of master substance depositing on a part of the first substrate area, a first blanket layer and depositing on the second substrate area a second blanket layer, wherein the shape of the first substrate area is substantially similar to the shape of the second substrate area; and the shape of the first blanket layer is substantially complementary to the shape of the second blanket layer relative to the shape of the first substrate area. This option allows for more flexibility in design of the optical element, providing more options for positive discharge of the optical element from the moulds.

A second aspect provides a method of manufacturing an optical element. the method comprises: providing a first mould manufactured in accordance with the method of any of the preceding claims, providing a second mould manufactured in accordance with the method of the first aspect in any way, joining the first mould and the second mould such that a first negative of the first master piece is provided adjacent to a second negative of the second master piece, providing a optical element material in a cavity provided by at least the first negative and the second negative, allowing the optical element material to settle and removing the optical element from the first mould and the second mould.

In this method, joining the first mould and the second mould may comprise mating the first alignment element or a negative thereof with the second alignment element or a negative thereof.

BRIEF DESCRIPTION OF THE DRAWINGS

The various aspects and examples thereof will now be discussed in further detail in conjunction with drawings. In the drawings, FIG. 1 A shows a three-dimensional model of a lens;

FIG. 1 B shows two sections of the three-dimensional model;

FIG. 2 shows two master pieces printed on a substrate;

FIG. 6 B shows two other master pieces printed on a substrate; and

DETAILED DESCRIPTION

FIG. 1 A shows an electronic three dimensional model 100 as a representation of a lens as an optical element. The three-dimensional model 100 is provided by a data comprised by a first dataset. FIG. 1 A further shows a virtual section plane 180 intersecting the three-dimensional model 100. In this embodiment, the intersection plane 180 intersects the three-dimensional model 100 at a location of the largest cross-sectional diameter of the three-dimensional model 100. The section plane 180 divides the three-dimensional model 100 in a first model part 110 and a second model part 120. The first model part 110 is defined by data comprised by a first data sub-set and the second model part 120 is defined by a second data sub-set. The data comprised by the first data sub-set and the data comprised by the second data sub-set is fully or at least partially comprised by the first dataset.

Figure 7:
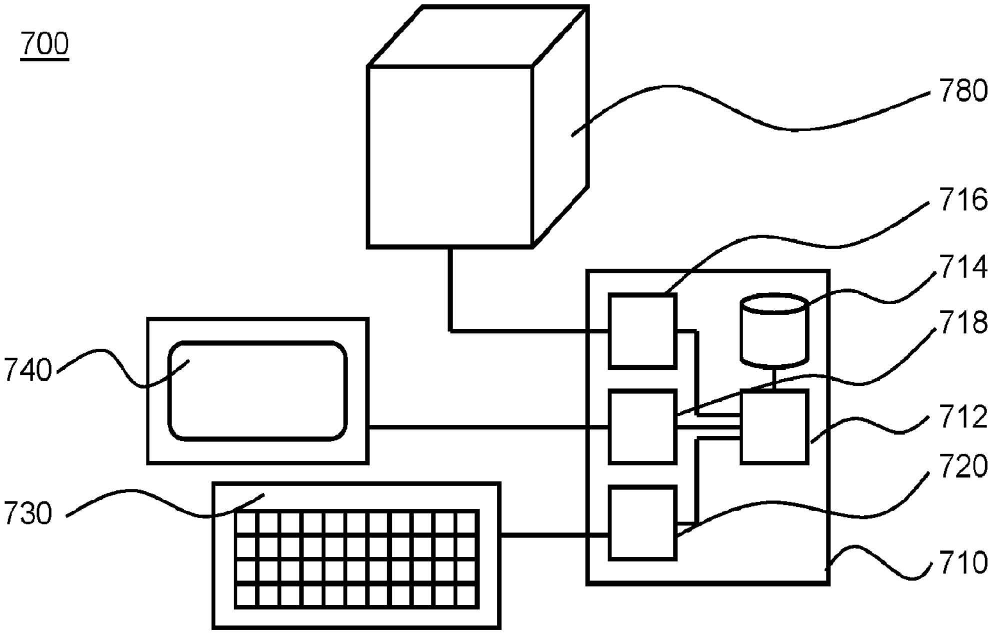
FIG. 7 shows a printing system.

The processing of the data of the first dataset may be handled by a three-dimensional printing system 700 as depicted by FIG. 7. The three-dimensional printing system 700 comprises an computing device 710 comprising a microprocessor 712 as an electronic processing unit, an electronic memory 714, an electronic output controller 716, a display controller 718 and an input controller 720. The input controller may be connected to an input device like a keyboard 730, touchscreen, mouse, trackball, other, or a combination thereof for receiving user input or input from another electronic processing device, for example over a network. The display controller 718 is arranged to provide data to a monitor 740 as an electronic display device for visual representation of data. The output controller 716 is arranged to provide data to a three-dimensional printer 780 to enable the printer 780 to print structures in accordance with data processed by the microprocessor 712. The microprocessor 712 is arranged to process data received, via the input controller 720 or from the electronic memory 714 to provide the data to the printing system 780 and, optionally, to control the printer 780.

In a particular embodiment, referring to FIG. 1 A and FIG. 1 B as well, the microprocessor 712 is arranged to determine a position for the section plane 180 relative to the three-dimensional model that is optimal or advantageous for the process outlined below. In the embodiment depicted by FIG. 1 A and FIG. 1 B, one section plane is shown. In other embodiments, multiple section planes by be defined, splitting a three-dimensional of an optical element in two or more parts, wherein each part is represented by data comprised by a dataset.

The data in the first data sub-set and the data in the second data sub-set are sent, by the electronic computing device 710, to the printer 780. Prior to sending the data, the data may be processed, like translated, ported, compiled, other, or a combination thereof. The data may be sent as two full sets or one set comprising both sub-sets at once or in parts.

FIG. 2 shows a substrate 200 with a first master piece 210 and a second master piece 220 printed thereon using the printer 780. The first master piece 210 and the second master piece 220 are preferably printed with opaque or coloured transparent or coloured translucent material. On the substrate 200, a plurality of holes 230 is provided as markers or marker points. In this embodiment, the markers are holes, but in other embodiments, the markers may be engravings, protrusions, recesses, prints, other, or a combination thereof. Preferably, the markers are located at accurately defined distances from one another. The first master piece 210 and the second master piece 220 are printed at well-defined positions relative to the holes 230, preferably be depositing droplets of liquid. The liquid deposited is preferably selected from a group of acrylics that may be UV curable. After deposition, the printed master pieces may be cured by means of heating, UV curing, other or a combination thereof.

Figure 3:
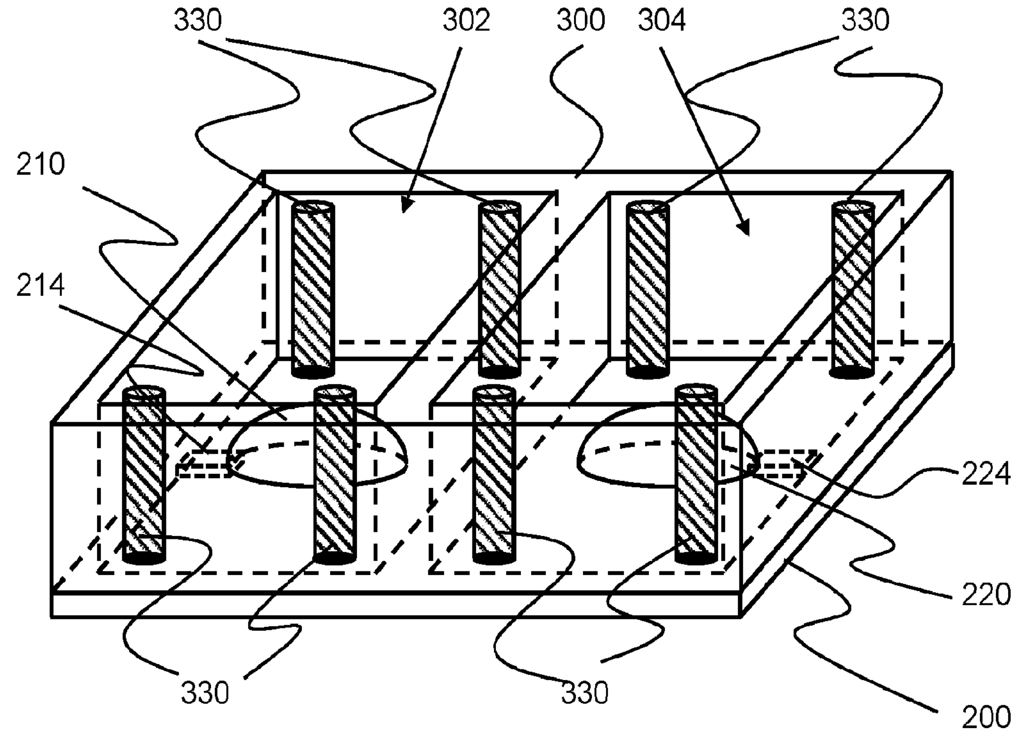
FIG. 3 shows the substrate with a formwork.

FIG. 3 shows a plurality of rods 330 as alignment elements provided in the holes 230. As such, the holes 230 are, in this embodiment, also provided as alignment engagement points. In other embodiments, the alignment engagement points are provided separately from the markers. In other embodiments, the alignment elements may be tubes or hollow rods, pins or other elements with a circular, rectangular, square or other cross-section provided in metal, a metal alloy, an organic polymer, other, or a combination thereof. Around the first master piece 210 and the second master piece, a formwork 300 is provided. Within the formwork, a first cavity 302 and a second cavity 304 are provided.

The formwork 300 is provided such that inner walls of the formwork 300 are spaced apart from the first master piece 210 and the second master piece 220. The formwork 300 is at the bottom aligned with the upper surface of the substrate 200. Between the first master piece 210 and an inner wall of the first cavity 302 of the formwork 300, a first feed negative 214 is provided. An between the second master piece 220 and an inner wall of the second cavity 304 of the formwork 300, a second feed negative 224 is provided.

In the cavities of the formwork, a mouldable compound is provided as a mould substance. The compound may comprise one or more materials, in solid or liquid form or a mixture thereof. Preferably, the mouldable compound is curable, for example by heating, cooling, exposure to UV light, exposure to oxygen, nitrogen, another gas or a combination thereof, by reaction of two or more materials in the compound, other, or a combination thereof. In a preferable embodiment, a silicone based curable compound is used, preferably applied in a low pressure environment preferably in the order of one Pascal or one millitorr.

Figure 4:
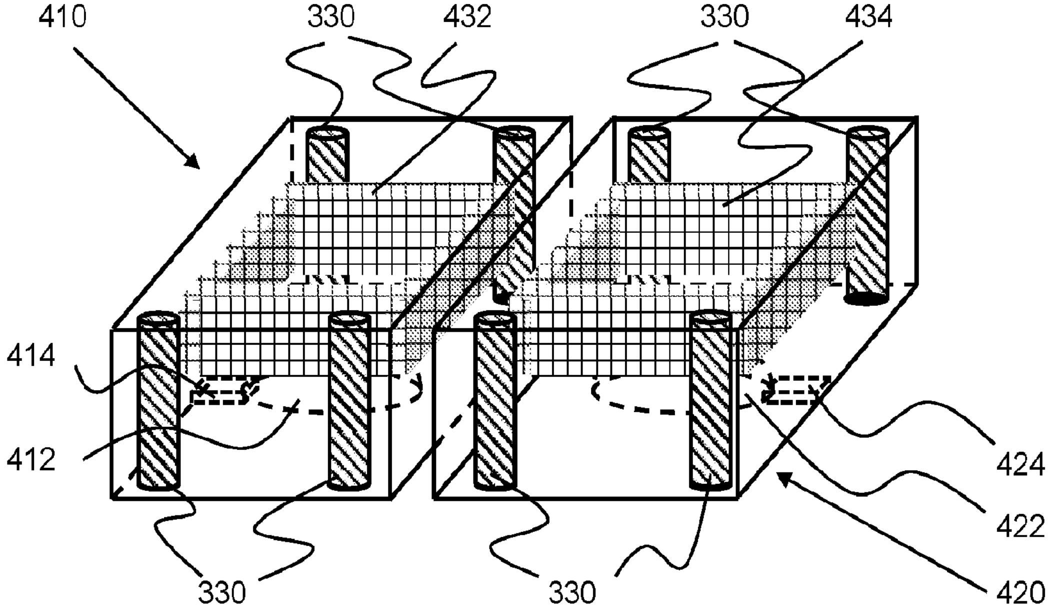
FIG. 4 shows two mould parts.

Prior to providing the mouldable compound in the cavities of the formwork 300, reinforcement structures may be provided in the cavities, either directly on the substrate 200 or suspended above the substrate. FIG. 4 shows a first mould 410 of cured mouldable compound, after curing. Inside the first mould 410, a first reinforcement structure 432 is provided. inside the second mould 420, a second reinforcement structure 434 is provided. In the embodiment shown, the reinforcement structures are rectangular or square structures that are open in the middle. In other embodiments, each reinforcement structure may comprise multiple elements, either connected to one another or loose from one another.

In the first mould 410, a first cavity 412 is located as the mouldable compound has been shaped around the first master piece 210 upon being provided in the first cavity 302. In the second mould 420, a second cavity 422 is located as the mouldable compound has been shaped around the second master piece 220 upon being provided in the second cavity 304. With mouldable compound having been provided around the first feed negative 214 and the second feed negative 224, a first feed opening 414 has been provided in the first mould 410 and a second feed opening 424 has been provided in the second mould 420. In another implementation, only one of the two feed openings is provided. The rods 330 may be left in the moulds. Alternatively, at least some rods 330 may be removed and optionally be replaced by other alignment elements.

Figure 5:
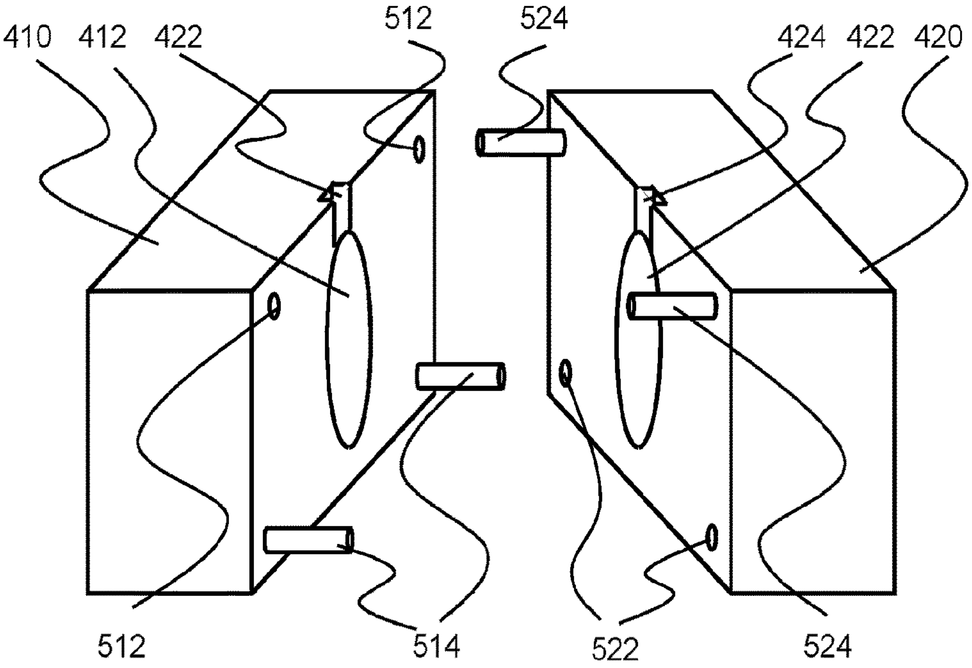
FIG. 5 shows the two mould parts opposite to one another.

FIG. 5 shows the first mould 410 and the second mould 420 opposite to one another. The first mould 420 comprises first holes 512 as alignment members that are arranged to mate with first rods 524 as protrusions provided in the second mould 420. The second mould 420 comprises second holes 522 as alignment members that are arranged to mate with second rods 514 as protrusions provided in the first mould 410. The first rods 524 and the second rods 514 may be the same as the rods 330 or different rods. The first mould 410 is joined with the second mould 420 by mating of the first rods 524 with the first holes 512 and by mating of the second rods 514 with the second holes 522.

After joining of the first mould 410 with the second mould 420, the moulds may be clamped together. Subsequently, a further mouldable compound is provided in the combined cavity provided by the first cavity 412 and the second cavity 422, via an inlet provided by the first feed opening 414 and the second feed opening 424. In a further embodiment, an excess exit opening may be provided in one, two or all of the mould parts to enable excess lens material to leave the mould. Furthermore, this excess exit opening may serve as an exit for air or any or gases or mixture of gases while the lens material is provided in the joint cavity provided by the first cavity 412 and the second cavity 422.

The feed openings—the first feed opening 414, the second feed opening 424 and any further feed opening—may be provided by means of a separate master piece provided when a mould part is being manufactured, by printing one or more masterpiece together with the printing of the master pieces, or by means of cutting part of any mould part, either before or after curing of the substance of the mould part, if such curing is applicable. The cutting may be provided by means of laser cutting, water cutting, cutting may by means of any sharp tool like a knife, other, or a combination thereof.

After filling of the combined cavity, the further mouldable compound is cured, either inside the combined cavity and/or after removal from the first mould 410 and the second mould 420. The cavity is preferably filled with the lens mouldable compound in a low pressure environment, preferably in the order of one Pascal or one millitorr.

Figure 6A:
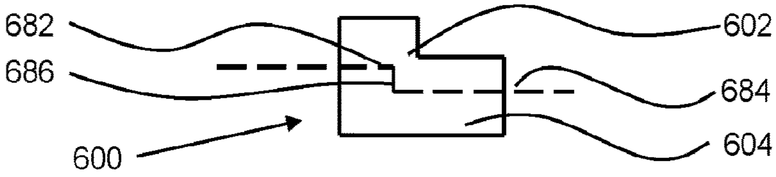
FIG. 6 A shows another three-dimensional model of a lens
Figure 6B:
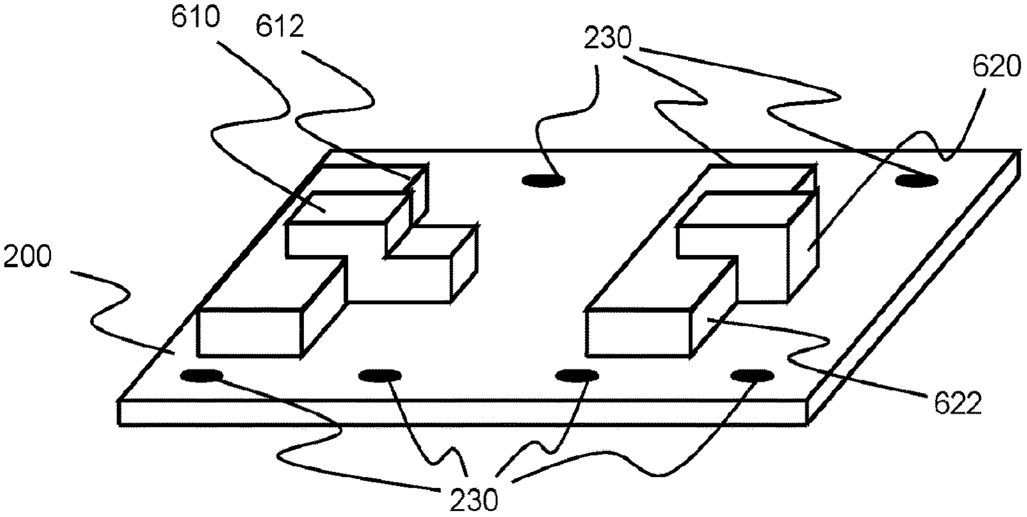

FIG. 6 A shows a further electronic three dimensional model 600 as a representation of a further optical element. In FIG. 6 A, a first intersection plane 682 or first intersection plane part, a second intersection plane 684 and a third intersection plane 684 are depicted. The three intersection planes divide the further electronic three dimensional model 600 in two parts: a first model part 602 and a second model part 604. The first intersection plane 682 and the second intersection plane 684 are parallel relative to one another and the third intersection plane 686 is provided perpendicular to the first intersection lane 682 and the second intersection plane 684.

FIG. 6 B shows a first master piece 610 representing the first model part 602 and a second master piece 620 representing the second master piece 604. The first master piece 610 and the second master piece 620 are printed on the substrate 200 as discussed above in conjunction with FIG. 2. Furthermore, the first master piece 610 is printed together with a first support structure 612 and the second master piece 620 is printed together with a second support structure 622. After manufacturing of moulds using the procedure as discussed above, the negatives of the first support structure 612 and the second support structure 614 are complementary to one another. Hence, when moulds are manufactured using the master structures as depicted by FIG. 6 B and such moulds are used for manufacturing an optical element, the optical element thus manufactured corresponds to the further electronic three dimensional model 600.

Without limitation, the disclosure relates to the following aspects and numbered options:

In summary, the disclosure further relates to a method wherein one or more master pieces, representing, in conjunction, an optical element like a lens, are printed on a substrate, for example by deposition of droplets of a master substance. In case of one or more master pieces, the pieces are well aligned relative to one another. The master substance is allowed to settle and subsequently, a mould substance is provided in one or more formworks provided around the master pieces. The mould substance is allowed to settle, thus providing one or more mould pieces with a partial cavity being the negative of the one or more master pieces. By proper alignment of the mould pieces, the partial cavities form a single compound cavity in which a lens compound may be provided for manufacturing of the optical element.

The invention claimed is:

1. A method of manufacturing a mould for an optical element, the method comprising:

receiving, in a three-dimensional printing system, a first dataset providing a three-dimensional representation of a first part of the optical element;

receiving, in the three-dimensional printing system, a second dataset providing a three-dimensional representation of a second part of the optical element;

depositing on a first substrate area, by the three-dimensional printing system, a first amount of master substance in accordance with the first dataset to provide a first master piece;

depositing on a second substrate area, by the three-dimensional printing system, a second amount of master substance in accordance with the second dataset to provide a second master piece;

providing, on the first substrate area, a first formwork around the first master piece;

providing, on the second substrate area, a second formwork around the second master piece;

providing a first alignment element in engagement with a first alignment element engagement point comprising the first substrate area, and providing a second alignment element in engagement with a second alignment element engagement point comprising the second substrate area;

providing a first reinforcement structure on or in a vicinity of the first substrate area and providing a second reinforcement structure on or in a vicinity of the second substrate area;

providing a first amount of mould substance in the first formwork and providing a second amount of mould substance in the second formwork, wherein the mould substance is provided in an environment with an ambient pressure of less than 1 Pascal, such that at least part of the first reinforcement structure and the second reinforcement structure are embedded in the mould substance;

allowing the first amount of mould substance to settle, thus forming a first mould;

allowing the second amount of mould substance to settle, thus forming a second mould; and removing the first formwork and the second formwork.

2. The method of claim 1, further comprising:

receiving, in a computer system, a master data set providing a three-dimensional model of the optical element;

determining a section plane intersecting at least part of the three-dimensional model; and defining the first dataset on a first side of the section plane and the second dataset on a second side of the section plane.

3. The method of claim 1, wherein the first substrate area and the second substrate area are flat.

4. The method according to claim 1, wherein the first substrate area comprises a first marker point and the second substrate area comprises a second marker point, and wherein the first amount of master substance is deposited aligned with the first marker point and the second amount of master substance is deposited aligned with the second marker point.

5. The method according to claim 1, wherein at least one of the first alignment element and a negative thereof in the first mould is arranged to mate with at least one of the second alignment element and a negative thereof in the second mould.

6. The method of claim 1, wherein the first reinforcement structure surrounds the first substrate area and the second reinforcement structure surrounds the second substrate area.

7. The method according to claim 1, further comprising providing a first master flow channel ranging from a perimeter of the first substrate area to the first amount of master substance.

8. The method according to claim 1, further comprising, prior to or in combination with depositing the first amount of master substance and the second amount of master substance:

depositing on a part of the first substrate area, a first blanket layer;

depositing on the second substrate area a second blanket layer;

wherein a shape of the first substrate area is substantially similar to a shape of the second substrate area; and wherein a shape of the first blanket layer is substantially complementary to a shape of the second blanket layer relative to the shape of the first substrate area.

9. The method according to claim 1, wherein the mould substance comprises an elastomer.

10. The method according to claim 1, wherein the first substrate area and the second substrate area are provided on a single substrate.

11. A method of manufacturing an optical element, comprising:

providing a first mould and a second mould manufactured in accordance with the method of claim 1;

joining the first mould and the second mould such that a first negative of the first master piece is provided adjacent to a second negative of the second master piece;

providing an optical element substance in a cavity provided by at least the first negative and the second negative in an environment with an ambient pressure of less than 1 Pascal;

allowing the optical element substance to settle; and removing the optical element from the first mould and the second mould.

12. The method according to claim 11, wherein joining the first mould and the second mould comprises mating a first alignment element or a negative thereof with a second alignment element or a negative thereof.

13. The method according to claim 5, wherein joining the first mould and the second mould comprises mating the first alignment element or a negative thereof with the second alignment element or a negative thereof.

* * * * *